Figure 1:
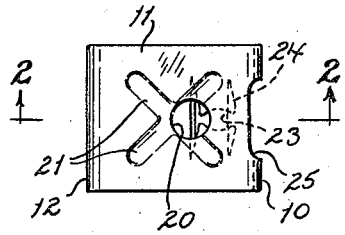

Dec. 11, 1945.   G. A. TINNERMAN   2,390,750
FASTENING DEVICE
Filed March 8, 1943

INVENTOR.
George A. Tinnerman
BY Bates, Teare M'Beau
Attorneys.

Patented Dec. 11, 1945

2,390,750

UNITED STATES PATENT OFFICE 2,390,750

FASTENING DEVICE

George A. Tinnerman, Cleveland, Ohio, assignor to Tinnerman Products, Inc., Cleveland, Ohio, a corporation of Ohio Application March 8, 1943, Serial No. 478,354

11 Claims. (Cl. 85—36)

This invention relates to a fastening device adapted for ready mounting on a support having a projecting flange as, for instance, a stringer, beam, or other metallic structural member. Such stringers, particularly those employed as longerons in airplane work, are frequently in the form of angle bars, often having a beaded edge, and it is desired to clamp to such structures various members (conduits or a bundle of wires for example) to hold such members in place where they cross the support or extend along it.

Heretofore, it has been customary to drill a hole through the structural flange, and bolt an angle bracket to it to carry a clamp for the member to be secured. This has had various disadvantages including the weakening of the supporting structure, the cost and delay of drilling, and the difficulty of locating the spot where the clamp is to be applied.

It has also been proposed to utilize a U-shaped spring metal clip having one leg attached to the clamp which embraces the article to be secured. Such clip could be sprung over the beaded edge of the flange, the natural resilience of the metal being relied on to produce a frictional engagement with the opposite faces of the flange. This avoided drilling the flange and allowed the clip to be located at any point on the structural beam as desired, but has not been satisfactory because there is no binding engagement of the clip with the structural member, and the clip is likely to slide along it, thus displacing the clamp.

The present invention solves the difficulty by providing a fastening device in the form of a spring metal clip doubled on itself to produce two legs connected by a return bend, each of which legs is then bent in the same general direction from the intermediate portion to produce two free leg portions adapted to embrace the structural flange, while the two intermediate leg portions project in superposed relation at an angle to the flange. By forcing these superposed portions of the leg toward each other and holding them in such constricted position the free portions of the legs are caused to bear against the flange of the structural member with a very tight binding engagement.

I provide the two projecting superposed portions of the legs with registering bolt openings, so that a bolt may be passed through them, and, by being turned into a nut, draw these intermediate portions toward each other and hold them in such position. Preferably the nut for such bolt is provided by a deformed edge about the bolt opening on one of the intermediate leg portions, such edge making a helical turn to act as a nut for the bolt.

The construction above outlined provides a single integral fastening device which may be readily sprung into position over the beaded edge of the structural flange and when in position is ready to receive the bolt to draw the superposed portions of the legs together and effect a very tight clamping of the free end of the legs with the structural flange. A further advantage of this construction is that the same bolt which thus causes the clamping of the fastener on the flange may also serve to attach the device to be secured, or a clamp surrounding it, to the fastener.

My invention, and a number of its advantages, are hereinafter more fully explained in connection with the detailed description of two embodiments thereof illustrated in the drawing.

Figure 3:
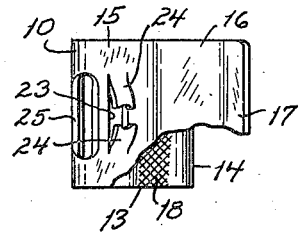
Figure 2:
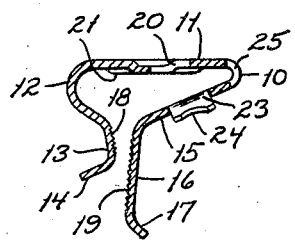
Figure 4:
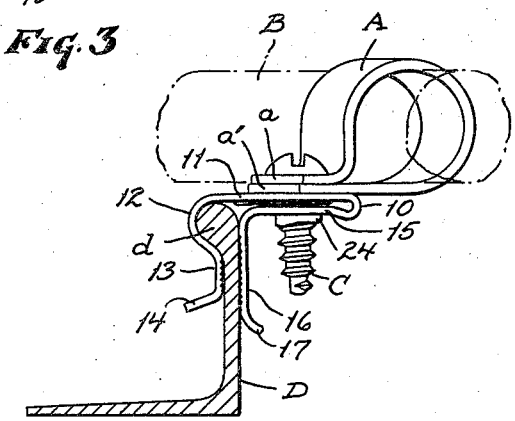
Figures 5, 6:
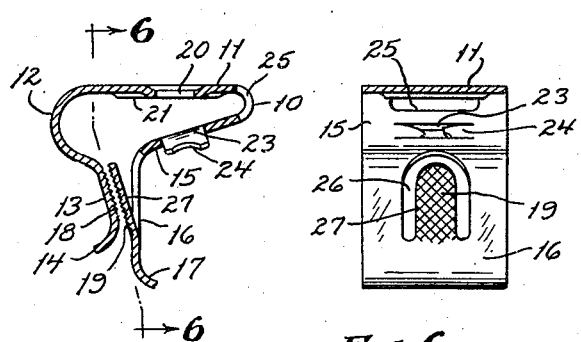
Figure 7:
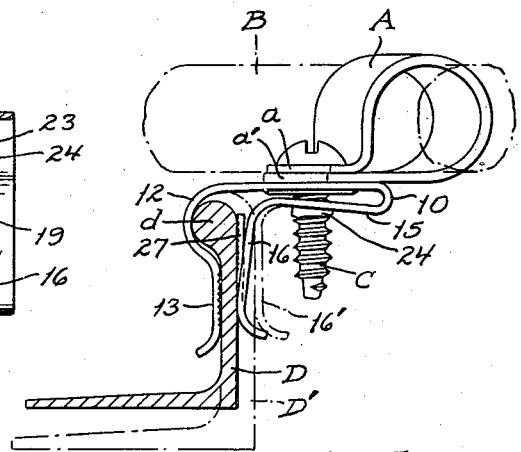

In the drawing, Fig. 1 is a plan of one embodiment of my fastening device; Fig. 2 is a section thereof in a plane indicated by the line 2—2 on Fig. 1; Fig. 3 is an elevation partly broken away of the device looking toward the right hand side of Fig. 2; Fig. 4 is an edge view of the fastening device mounted on a structural flange and carrying a suitable clamp; Fig. 5 is a vertical section of a modified form of the fastening device; Fig. 6 is a cross section of the device shown in Fig. 5, in a plane indicated by the offset line 6—6; Fig. 7 is an edge view of the fastening device of Figs. 5 and 6, mounted on a flanged beam and carrying a suitable clamp, this view indicating in broken lines a larger flanged beam with the same fastening device mounted thereon.

As shown in each of the figures, my fastening device in a single strip of spring sheet metal doubled on itself to present what may conveniently be called an upper leg and a lower leg connected by a return bend. The return bend is designated 10. The upper leg presents first a top portion 11, then a downwardly extending loop portion 12, rounded preferably on a greater radius than the return bend, then a downwardly extending leg 13 leading from the rounded portion 12 and terminating in an outwardly directed end portion 14. From the return bend 10, a lower leg portion 15 leads in an inclined direction toward the leg 13 and at its end carries the flat leg portion 16 which terminates in an outwardly extending portion 17.

A bolt opening 20 extends through the top portion 11 and this part is preferably stiffened about the opening by the crossing corrugations 21. In the lower leg portion 15, I form an opening 23 adapted to register with the opening 20, so that a bolt may be passed through the two openings to force the legs together. Preferably the metal about this opening 23 is deformed to provide thread-engaging means. As shown this comprises a pair of opposed tongues 24 partially severed from the leg portion 15 and bent at an acute angle thereto and having their end portions recessed and warped so as to define a helical turn.

It results from the construction described that if a threaded bolt or screw is passed through the openings 20 and 23, its thread may be engaged by the tongues 24 which act as a nut therefor and then as the bolt or screw is tightened the two free legs 13 and 16 are caused to clamp upon the flange interposed between them.

In Fig. 4, A indicates a clamp looping around an object to be secured which may, for instance, be a conduit, or a bundle of wires or other article indicated at B. A screw designated C passes through the projecting end arms a and a' of the clamp A. This screw then passes through the openings 20 and 23 of the fastening device and receives its nut by the tongues 24. In this view D indicates a structural member which is shown as an angle beam having a bead d at the edge of its flange. The loop portion 12 of the fastener embraces this bead and the two legs 13 and 16 engage opposite faces of the flange beneath the beaded edge and are forced very snugly into engagement therewith by the same tightening action of the screw C which secures the clamp A to the fastening device.

The two flaring ends 14 and 17 enable the ready mounting of the device, as these ends provide camming surfaces which may engage the bead d of the support and spread the legs as the fastener is forced into place. The return bend 10 may be cut away intermediately, as indicated at 25, to increase the flexibility of the bend relative to the other portions of the clip, and allow the fastener to be readily shoved across the beaded edge of the support.

The free legs 13 and 16 are shown as provided with serrations 18 and 19 on their inner faces to bite into the opposite faces of the structural flange and thus aid in the positive engagement of the clamp. However, my experience indicates that without the serrations the tightening of the screw holds the fastening device so firmly in place on the structural beam that there is little chance of its being shifted from position.

The various parts hereinbefore described are present in the second embodiment of my invention to which the same reference characters apply. However, the second embodiment has the further feature in that the depending free leg 16 has a U-shaped opening 26 formed in it, leaving a tongue 27 which is bent toward the leg 13 and carries the serrations 19. This spring tongue 27 gives the fastening device a wider range of use, enabling it to obtain the necessary tight engagement with structural supports of greatly varying dimensions.

In Fig. 7, when the fastener is mounted on the support D, the tongue 27 projects inwardly from the leg 16 to form the desired snug engagement, whereas if the structural shape were as large as that indicated in D' in Fig. 7, the leg 16 would take the position indicated at 16' and in that case the tongue 27 would be in the same plane as the rest of the leg. On the other hand, if the support were smaller than that indicated at D the tongue would project farther inwardly than shown at Fig. 7.

It will be seen that in each embodiment of my invention, I utilize the same clamping screw which attaches the clamp to cause a much tighter engagement of the fastening device with the structural flange than would result from merely the resilience of a spring clip, and likewise I have a much greater range of adaptability. My fastening device provides a flat surface which may project at 90° to the flange of the structural member and thus be in the most ready position for the mounting of the clamp, enabling the screw to pass through the clamp arms and the fastener and extend into an idle space alongside of the structural flange.

A further advantage of my fastening device is that the screw is accessible from the outer space for ready attachment of the fastener and also enables the fastener to be readily loosened should it be desired to change its place along the flange structural member.

The ability of my fastening device to accommodate a wide variety of sizes and shapes of rolled or extruded sections eliminates the necessity for using specifically different fastening devices for such different sizes or shapes.

The entire fastening device is very simple in construction and provides at once the angle bracket having its own nut and clamping legs to engage the supporting flange without requiring any drilling or other treatment of the flange. An advantage in my fastening device, much appreciated in airplane work, is the speed with which the device may be applied.

I claim:

1. A fastening device comprising a strip of spring material doubled on itself to provide an intermediately located doubled portion and two projecting legs extending in the same general direction at an angle to the intermediate portion, said legs lying alongside of each other and adapted to embrace a support between their opposed side faces, there being registering bolt openings through the members of the intermediate doubled portion and thread-engaging means carried by one of said members about the bolt opening, whereby a single bolt may serve to attach a device to the fastener and to force the legs of the fastener into increased clamping action against a supporting flange embraced thereby.

2. A fastening device made of a strip of spring sheet material doubled on itself by a return bend and comprising two approximately horizontal portions leading from the return bend and two approximately vertical portions leading downwardly from the free ends of the horizontal portions, the downward portions being adapted to engage opposite sides of an embraced supporting flange and the two horizontal portions having registering bolt openings, the material about one of the bolt openings being deformed to provide a helical edge to engage the thread of a clamping screw passing through the openings.

3. A fastening device comprising a strip of spring sheet material doubled on itself to provide first an intermediate U-shaped portion with one leg longer than the other and second two free legs projecting from the intermediate portion at approximately right angles thereto, the leg which projects from the longer intermediate part being connected therewith by a looped portion adapted to embrace the bead of a structural member when the free legs engage opposite faces of the web of such member registering bolt openings through the two intermediate leg portions, the material of one of such intermediate legs being deformed about its opening to provide a helical thread.

4. A fastening device made of a single strip of sheet material doubled on itself to provide a top member and a lower member connected by a bend of relatively small radius, the top member extending farther than the lower member, and downwardly extending portions from the two intermediate members, one of such portions being connected with the end of the longer intermediate member by a loop of larger radius than that of the doubling bend and then continuing as a shorter straight leg, the lower member of the intermediate portion continuing downwardly as a longer straight leg opposite said shorter leg.

5. A fastening device comprising a strip of spring material doubled on itself to provide two intermediate legs connected by the return bend and two free legs projecting at an angle to the intermediate legs and lying alongside of each other, serrations on the active side face of one of the free legs, and means for forcing the intermediate legs toward each other.

6. A fastening device comprising a strip of spring material doubled on itself to provide two intermediate legs connected by the return bend and two free legs projecting at an angle to the intermediate legs, said legs lying alongside of each other and adapted to engage an intermediate support between their opposed side faces and serrations on the active faces of said free legs.

7. A fastening device comprising a strip of spring sheet material doubled on itself to provide two intermediate legs connected by a return bend and two free legs connected with the free ends of the intermediate legs, such free legs being at an angle to the intermediate legs and one of the intermediate legs being longer than the other and the longer one being connected with its free leg by a curved looping portion, the free legs being adapted to embrace a supporting flange and having serrations on their adjacent faces.

8. A fastening device comprising a strip of spring sheet material doubled on itself to provide two intermediate legs connected by a return bend and two free legs connected with the free ends of the intermediate legs, such free legs being at an angle to the intermediate legs, the free legs being adapted to embrace a supporting flange between their adjacent side faces and having serrations on side faces, one of the intermediate legs having an opening for the free passage of a bolt or screw and the other intermediate leg having a pair of tongues cut from the material of the leg and diverted at an acute angle thereto spaced apart at their ends and warped to provide a helical turn to receive a clamping screw passing through the opening of the other intermediate leg.

9. A fastening device made of spring material intermediately doubled on itself to provide a return bend leading to two legs, each intermediate leg being continued to provide a free leg which lies in a direction at an angle to the intermediate leg, both free legs being approximately parallel and one of the free legs having a U-shaped opening through it providing a tongue which is bent from that leg toward the other free leg.

10. A fastening device comprising a strip of spring material intermediately doubled on itself by a return bend to provide an upper and lower leg, the upper leg being longer than the lower leg and continuing at its free end into a downwardly curved loop, the lower end of the loop continuing as a substantially flat leg, the lower leg standing normally at an acute angle to the upper leg and being bent downwardly at its free end to present a substantially flat portion forming a free leg, said free leg connected with said lower leg being provided with a tongue partially severed therefrom and bent toward the opposing leg, the intermediate legs having registering bolt openings and deformed material on one of such intermediate legs about its bolt opening to provide a thread for a clamping screw.

11. A fastening device comprising a strip of spring sheet material doubled on itself to provide first an intermediate U-shaped portion with one leg longer than the other and second two free legs projecting in the same general direction from the intermediate portion and at an angle thereto, the leg which projects from the longer intermediate part being connected therewith by a looped portion adapted to embrace the bead of a structural member when the free legs engage opposite faces of the web of such member, the two intermediate portions having registering bolt openings whereby an angle bracket is provided which may be tightly clamped to such web and project at substantially right angles thereto.

GEORGE A. TINNERMAN.